United States Patent
Yoshida

(10) Patent No.: US 12,410,585 B2
(45) Date of Patent: Sep. 9, 2025

(54) WORK MACHINE

(71) Applicant: KOMATSU LTD., Tokyo (JP)

(72) Inventor: Hiroyuki Yoshida, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/850,677

(22) PCT Filed: Mar. 15, 2023

(86) PCT No.: PCT/JP2023/010028
§ 371 (c)(1),
(2) Date: Sep. 25, 2024

(87) PCT Pub. No.: WO2023/195313
PCT Pub. Date: Oct. 12, 2023

(65) Prior Publication Data
US 2025/0215662 A1     Jul. 3, 2025

(30) Foreign Application Priority Data

Apr. 8, 2022 (JP) .................................. 2022-064634

(51) Int. Cl.
*E02F 9/20* (2006.01)
*B62D 12/00* (2006.01)
*E02F 9/22* (2006.01)

(52) U.S. Cl.
CPC ............ *E02F 9/2004* (2013.01); *B62D 12/00* (2013.01); *E02F 9/225* (2013.01)

(58) Field of Classification Search
CPC ...... G05G 9/047; G05G 1/06; F15B 13/0422; B60N 2/797; E02F 9/2004; E02F 9/225; B62D 12/00
See application file for complete search history.

(56) References Cited

U.S. PATENT DOCUMENTS 6,328,127 B1   12/2001   Hori et al.
11,400,972 B2 *  8/2022   Teranishi ............... B62D 12/00
(Continued)

FOREIGN PATENT DOCUMENTS

JP     S57-055026 U    3/1982
JP     H02-102876 U    8/1990
(Continued)

OTHER PUBLICATIONS

JP2020026233A Machine English Translation (Year: 2020).*

*Primary Examiner* — Jason D Shanske
*Assistant Examiner* — Matthew James O'Neill
(74) *Attorney, Agent, or Firm* — Faegre Drinker Biddle & Reath LLP

(57) ABSTRACT

There is provided a work machine allowing a steering operation device to be enhanced in reliability. The steering operation device includes a joystick, a first electric lever, and an input unit. The joystick receives an operator's operation. The first electric lever includes a first main body unit and a first lever unit tiltable with respect to the first main body unit, and outputs a tilt angle of the first lever unit with respect to the first main body unit. The input unit inputs an input to the first lever unit of the first electric lever to tilt the first lever unit with respect to the first main body unit of the first electric lever. The input unit has an elongated hole extending in the frontward/rearward direction. The first lever unit is disposed in the elongated hole.

8 Claims, 8 Drawing Sheets

(56) References Cited

U.S. PATENT DOCUMENTS

| | | |
|---|---|---|
| 2017/0037599 A1 | 2/2017 | Binstock et al. |
| 2020/0299930 A1 | 9/2020 | Wuisan et al. |
| 2021/0156117 A1 | 5/2021 | Teranishi et al. |
| 2021/0156118 A1 | 5/2021 | Teranishi et al. |
| 2022/0010525 A1* | 1/2022 | Prokopowicz ...... F15B 13/0422 |

FOREIGN PATENT DOCUMENTS

| | | | | |
|---|---|---|---|---|
| JP | H11-158932 A | | 6/1999 | |
| JP | 2001-020907 A | | 1/2001 | |
| JP | 2020-026230 A | | 2/2020 | |
| JP | 2020026233 A | * | 2/2020 | ............... B62D 1/12 |

* cited by examiner

VEHICULAR BODY
BENDING ANGLE

WORK MACHINE

TECHNICAL FIELD

The present disclosure relates to a work machine.

BACKGROUND ART

Japanese Patent Laying-Open No. 2020-026230 (PTL 1) discloses a steering device for operating an articulated work vehicle. A joystick lever is configured to be pivotable with respect to a base member or a support unit. A lever angle sensor senses an angle of the joystick lever with respect to the support unit. A vehicular body frame angle sensor senses a pivot angle of a front frame with respect to a rear frame. A controller controls an electromagnetic pilot valve based on a detection value of the lever angle sensor and that of the vehicular body frame angle sensor. The electromagnetic pilot valve adjusts a pilot oil pressure supplied to a hydraulic valve. In response to a pilot oil pressure received, the hydraulic valve adjusts a flow rate of oil supplied to a steering cylinder.

CITATION LIST

Patent Literature

PTD 1: Japanese Patent Laying-Open No. 2020-026230

SUMMARY OF INVENTION

Technical Problem

A steering operation device comprising an electric lever which detects that a joystick is operated is being devised in place of a pilot valve that supplies a pilot oil pressure to a hydraulic valve. In response to the operation of the joystick, an electrical signal is output from the electric lever to a controller, and in response to the received electrical signal, the controller controls a steering actuator.

A steering operation device comprising an electric lever is desired to avoid a situation in which the electric lever does not output an electrical signal, and thus enhance reliability.

The present disclosure proposes a work machine allowing a steering operation device to be enhanced in reliability.

Solution to Problem

The presently disclosed work machine comprises a vehicular body frame, a steering actuator, and a steering operation device. The vehicular body frame includes a rear frame and a front frame pivotably coupled to the rear frame. The steering actuator changes an angle of the front frame with respect to the rear frame. The steering operation device is operated by an operator to operate the steering actuator. The steering operation device includes a joystick, at least one electric lever, and an input unit. The joystick receives the operator's operation. The electric lever includes a main body unit and a lever unit tiltable with respect to the main body unit. The electric lever outputs a tilt angle of the lever unit with respect to the main body unit. The input unit inputs an input to the lever unit to tilt the lever unit with respect to the main body unit. The input unit has at least one elongated hole extending in a direction orthogonal to a direction in which the operator tilts the joystick. The lever unit is disposed in the elongated hole.

Advantageous Effects of Invention

The presently disclosed work machine can enhance a steering operation device in reliability.

DESCRIPTION OF EMBODIMENTS

Hereinafter, an embodiment will be described with reference to the drawings. In the following description, identical components are identically denoted. Their names and functions are also identical. Accordingly, they will not be described repeatedly in detail.

General Configuration of Wheel Loader 1

Figure 1:
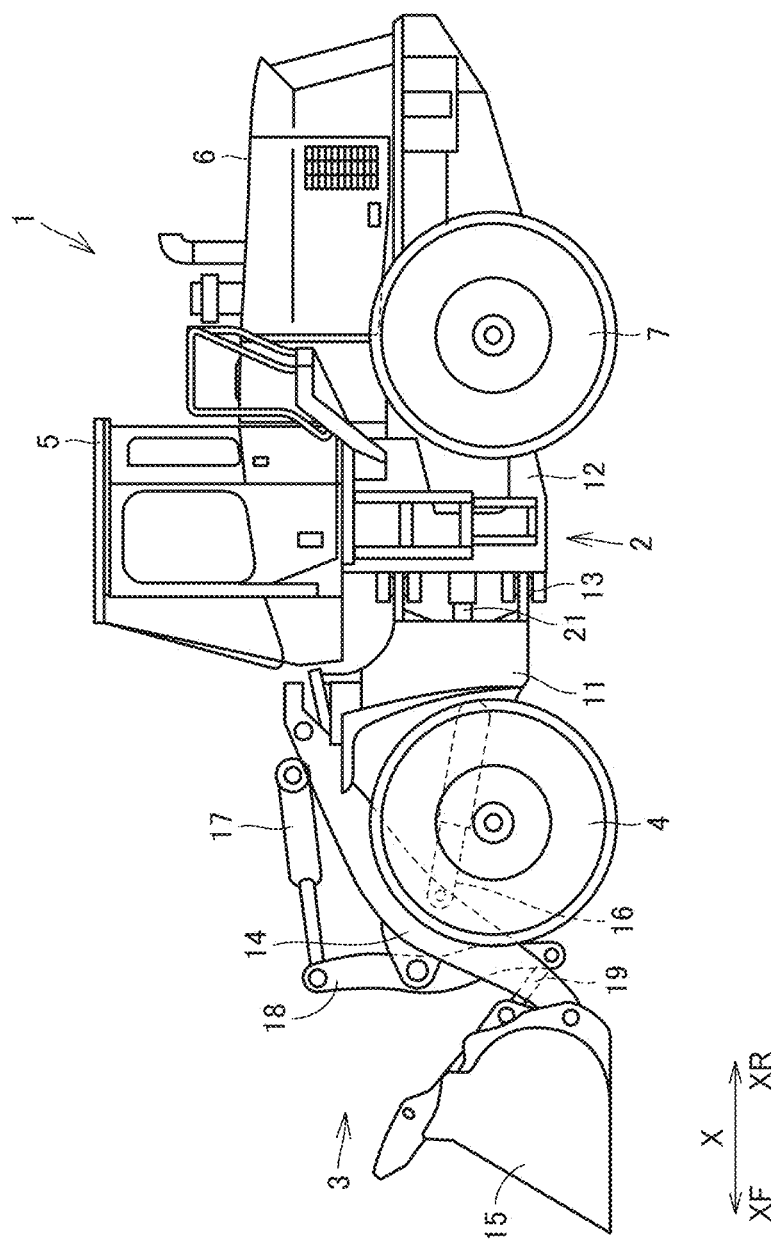
FIG. 1 is a side view of a wheel loader as an example of a work machine according to an embodiment.

In an embodiment, as one example of a work machine, a wheel loader 1 will be described. FIG. 1 is a side view of wheel loader 1 as an example of the work machine according to the embodiment.

As shown in FIG. 1, wheel loader 1 comprises a vehicular body frame 2, a work implement 3, a traveling apparatus, a cab 5, and an engine hood 6. Vehicular body frame 2, cab 5 and so forth configure a vehicular body of wheel loader 1 (or a main body of the work machine). Work implement 3 and the traveling apparatus are attached to the vehicular body of wheel loader 1.

The traveling apparatus causes the vehicular body of wheel loader 1 to travel, and includes traveling wheels 4 and 7. Wheel loader 1 is a wheeled vehicle comprising traveling wheels 4 and 7 as a rotary body on right and left, opposite sides of the vehicular body for traveling. Wheel loader 1 can be self-propelled as traveling wheels 4 and 7 are rotatably driven, and can perform a desired work such as excavating and loading soil using work implement 3.

In the present specification, a direction in which wheel loader 1 travels straight frontward/rearward is referred to as a frontward/rearward direction of wheel loader 1. In the frontward/rearward direction of wheel loader 1, a side on which work implement 3 is located with respect to vehicular body frame 2 is defined as a frontward direction, and a side opposite to the frontward direction is defined as a rearward direction. A rightward/leftward direction of wheel loader 1 is a direction orthogonal to the frontward/rearward direction in a plan view of wheel loader 1 when it is on a flat ground. When looking in the frontward direction, a right side and a left side in the rightward/leftward direction are a rightward direction and a rightward direction, respectively. An upward/downward direction of wheel loader 1 is a direction orthogonal to a plane defined by the frontward/rearward direction and the rightward/leftward direction. In the upward/downward direction, a side on which the ground is present is a downward side, and a side on which the sky is present is an upward side.

In the figures, an X direction indicated in FIG. 1 by a double-headed arrow is the frontward/rearward direction. An XF direction is the frontward direction, and an XR direction is the rearward direction. A Y direction shown in a figure referred to below is the rightward/leftward direction. A YL direction is the leftward direction, and a YR direction is the rightward direction.

Vehicular body frame 2 includes a front frame 11 and a rear frame 12. Front frame 11 is disposed in front of rear frame 12. Front frame 11 is connected to rear frame 12 bendably with respect thereto. Front frame 11 is pivotably connected to rear frame 12 by a coupling shaft unit 13. Coupling shaft unit 13, which defines a center about which front frame 11 pivots with respect to rear frame 12, is a shaft extending in the upward/downward direction. Coupling shaft unit 13 is provided at a center of vehicular body frame 2 in the rightward/leftward direction. Front frame 11 and rear frame 12 configure vehicular body frame 2 having an articulated structure. Wheel loader 1 is an articulated work machine with front frame 11 and rear frame 12 coupled together.

Front frame 11 and rear frame 12 are coupled by a steering actuator 21. Steering actuator 21 is disposed across front frame 11 and rear frame 12. Steering actuator 21 has a proximal end attached to rear frame 12. Steering actuator 21 has a distal end attached to front frame 11. A pair of right and left steering actuators 21 are provided. Steering actuators 21 are disposed side by side on opposite sides in the rightward/leftward direction with coupling shaft unit 13 interposed therebetween.

When steering actuator 21 is driven to extend and contract, front frame 11 moves rightward/leftward with respect to rear frame 12 with coupling shaft unit 13 serving as a center. Steering actuator 21 is, for example, a hydraulic actuator. Steering actuator 21 is, for example, a hydraulic cylinder. Steering actuator 21 causes front frame 11 to pivot with respect to rear frame 12. An angle of bending of front frame 11 with respect to rear frame 12 changes as steering actuator 21 extends and contracts.

Work implement 3 and a pair of right and left traveling wheels (or front wheels) 4 are attached to front frame 11. Work implement 3 is disposed in front of the vehicular body and supported by the vehicular body of wheel loader 1. Work implement 3 includes a boom 14 and a bucket 15. Bucket 15 is disposed at a distal end of work implement 3. Bucket 15 is a working tool for excavation and loading.

Work implement 3 includes a boom cylinder 16. Front frame 11 and boom 14 are coupled by a pair of boom cylinders 16. Boom cylinder 16 has a proximal end attached to front frame 11. Boom cylinder 16 has a distal end attached to boom 14. Boom cylinder 16 is a hydraulic actuator that moves boom 14 up and down with respect to front frame 11. As boom 14 moves up and down, bucket 15 attached to a distal end of boom 14 also moves up and down.

Work implement 3 further includes a bell crank 18, a coupling link 19, and a bucket cylinder 17. Bell crank 18 is rotatably supported by boom 14 substantially at a center of boom 14. Bucket cylinder 17 couples bell crank 18 and front frame 11. Coupling link 19 is coupled to a distal end of bell crank 18. Coupling link 19 couples bell crank 18 and bucket 15.

Bucket cylinder 17 has a proximal end attached to front frame 11. Bucket cylinder 17 has a distal end attached to a proximal end of bell crank 18. Bucket cylinder 17 is a hydraulic actuator that moves bucket 15 up and down with respect to boom 14. Bucket cylinder 17 is a working tool cylinder that drives bucket 15. Bucket 15 is configured to be operable with respect to boom 14, Bucket 15 is configured to be operable with respect to front frame 11.

Engine hood 6, cab 5 that an operator gets in, and a pair of right and left traveling wheels (or rear wheels) 7 are attached to rear frame 12. Engine hood 6 is provided behind cab 5. A hydraulic oil tank, an engine, a hydraulic pump, an air cleaner, and so forth are accommodated in engine hood 6.

Cab 5 is in the form of a box disposed behind work implement 3. Cab 5 is disposed on vehicular body frame 2. Cab 5 is mounted on rear frame 12. Cab 5 defines an indoor space that an operator gets in. A door that is opened and closed when the operator enters and exits cab 5 is provided on a left side of cab 5.

Figure 2:
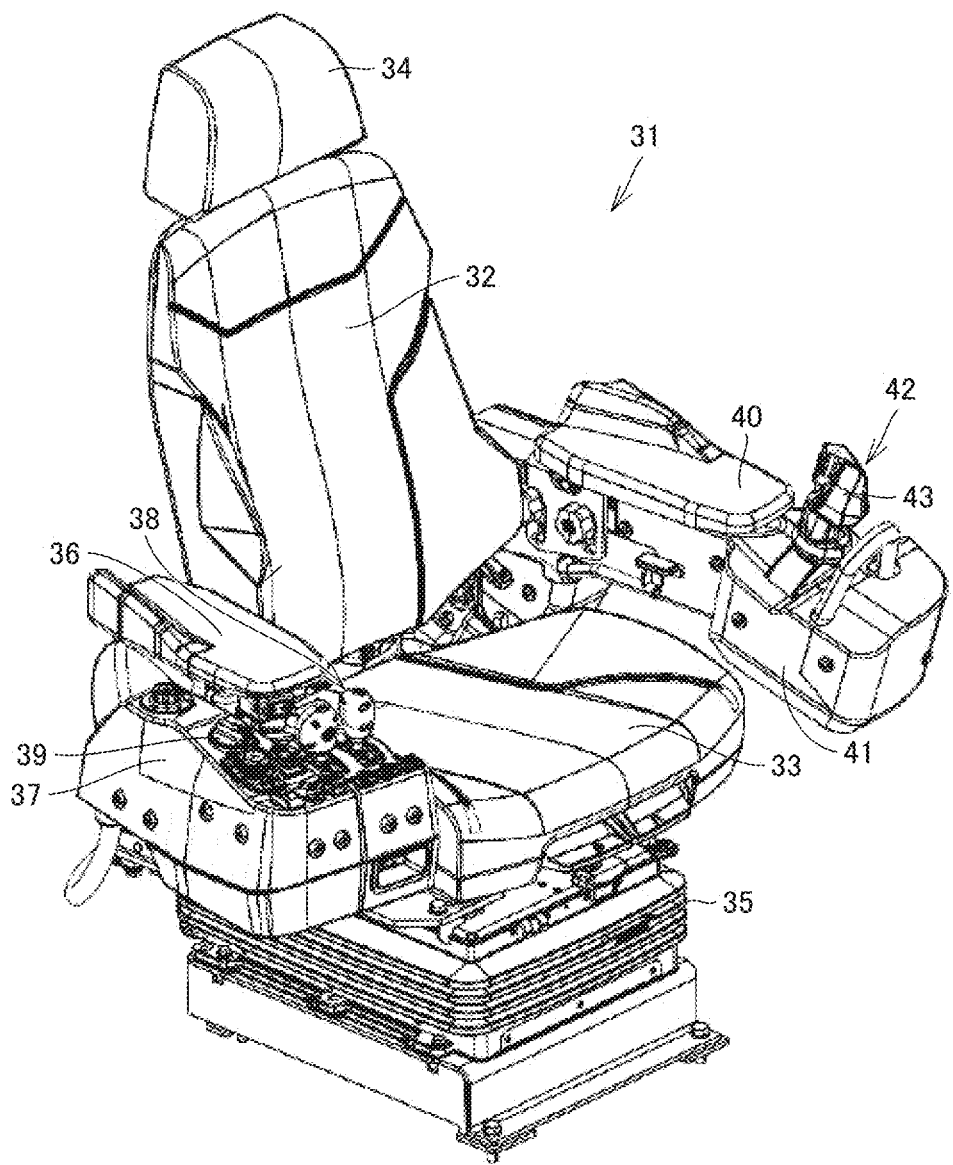
FIG. 2 is a perspective view showing a structure around a driver's seat in a cab.

FIG. 2 is a perspective view showing a structure in cab 5 around a driver's seat 31. Inside cab 5 are disposed driver's seat 31 on which an operator is seated, an operation device operated by the operator to operate wheel loader 1, and so forth. Driver's seat 31 is provided in the indoor space defined by cab 5. In cab 5, the operator is seated on driver's seat 31 and operates wheel loader 1. As shown in FIG. 2, driver's seat 31 includes a seat cushion 33, a seat back 32, a headrest 34, and a suspension mechanism unit 35.

Seat cushion 33 is provided to lie horizontally. Seat cushion 33 is a portion of the seat on which the operator is seated. Seat back 32 is provided so as to erect upward from a rear end of seat cushion 33. Seat back 32 is a portion of the seat serving as a backrest for the operator. Headrest 34 is attached to an upper end of seat back 32. Headrest 34 is a portion of the seat that supports the head of the operator.

Suspension mechanism unit 35 is provided between a floor surface of cab 5 and seat cushion 33 in the upward/downward direction. Suspension mechanism unit 35 elastically supports seat cushion 33.

A right armrest 36 and a right console 37 are disposed inside cab 5. Right armrest 36 and right console 37 are provided on a right side of driver's seat 31. Right console 37 is provided with a work implement operating lever 38, a dial device 39, and so forth. Work implement operating lever 38 is operated to control an operation of work implement 3, Dial device 39 is operated to control traveling of wheel loader 1. Dial device 39 may be a vehicular speed limiting dial operated to define a maximum value for a vehicular speed at which wheel loader 1 travels.

A left armrest 40 and a left console 41 are disposed inside cab 5. Left armrest 40 and left console 41 are provided on a left side of driver's seat 31. Left console 41 is provided between driver's seat 31 and the door of cab 5 in the rightward/leftward direction. Right console 37 and left console 41 are provided above seat cushion 33. Right armrest 36 and left armrest 40 are provided above seat cushion 33. Right armrest 36 and left armrest 40 have a cushioning material made of urethane foam or the like, and is used as an armrest for the operator.

Left console 41 is provided in front of left armrest 40. Left console 41 is provided with a steering operation device 42. Steering operation device 42 is disposed in cab 5. Steering operation device 42 is disposed on the left side of driver's seat 31. Steering operation device 42 is operated by an operator aboard cab 5 to pivot front frame 11 and rear frame 12. Steering operation device 42 is operated by an operator seated on driver's seat 31 to operate steering actuator 21.

Steering operation device 42 includes a joystick 43. Joystick 43 projects upward from an upper surface of left console 41. Joystick 43 is in the form of a lever. Joystick 43 receives the operator's operation. The operator holds joystick 43 with his/her left hand and tilts the joystick rightward/leftward to set an angle at which front frame 11 is bent with respect to rear frame 12.

Figure 3:
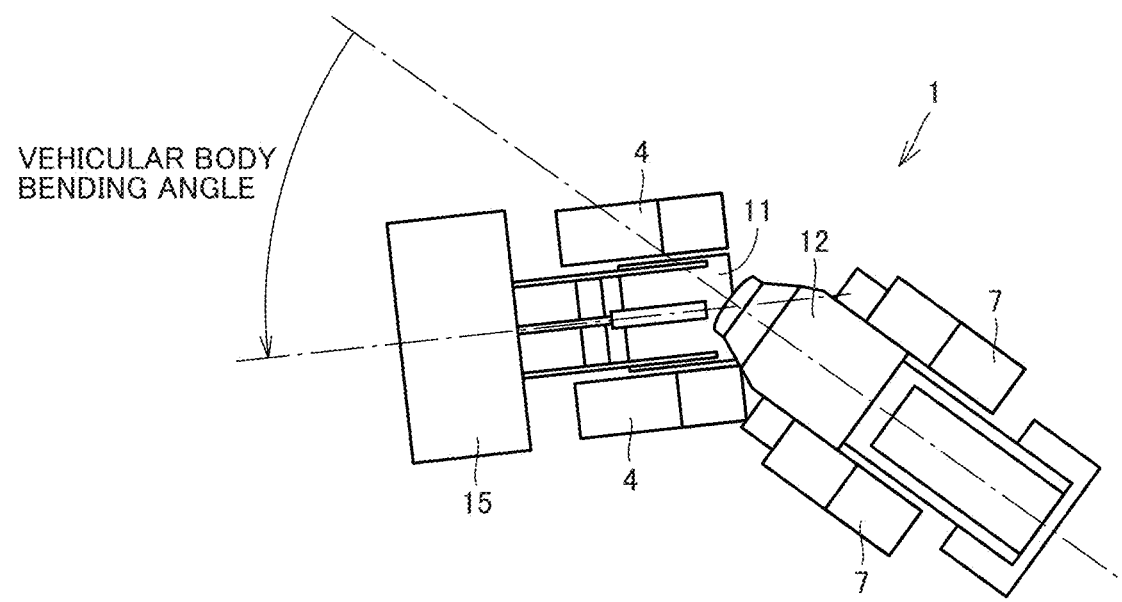
FIG. 3 is a schematic plan view of the wheel loader in a bent state.

FIG. 3 is a schematic plan view of wheel loader 1 in a bent state. Front frame 11 is bent with respect to rear frame 12 by extending and contracting steering actuator 21 coupled to front frame 11 and rear frame 12. A vehicular body bending angle shown in FIG. 3 is an angle at which front frame 11 bends with respect to rear frame 12. When wheel loader 1 moves straight ahead, it has a vehicular body bending angle of 0 degree. When one of right and left steering actuators 21 extends and the other contracts, a vehicular body bending angle larger than 0 degree is formed. Front frame 11 is bent with respect to rear frame 12, as shown in FIG. 3, by right steering actuator 21 extending and left steering actuator 21 contracting.

Figure 4:
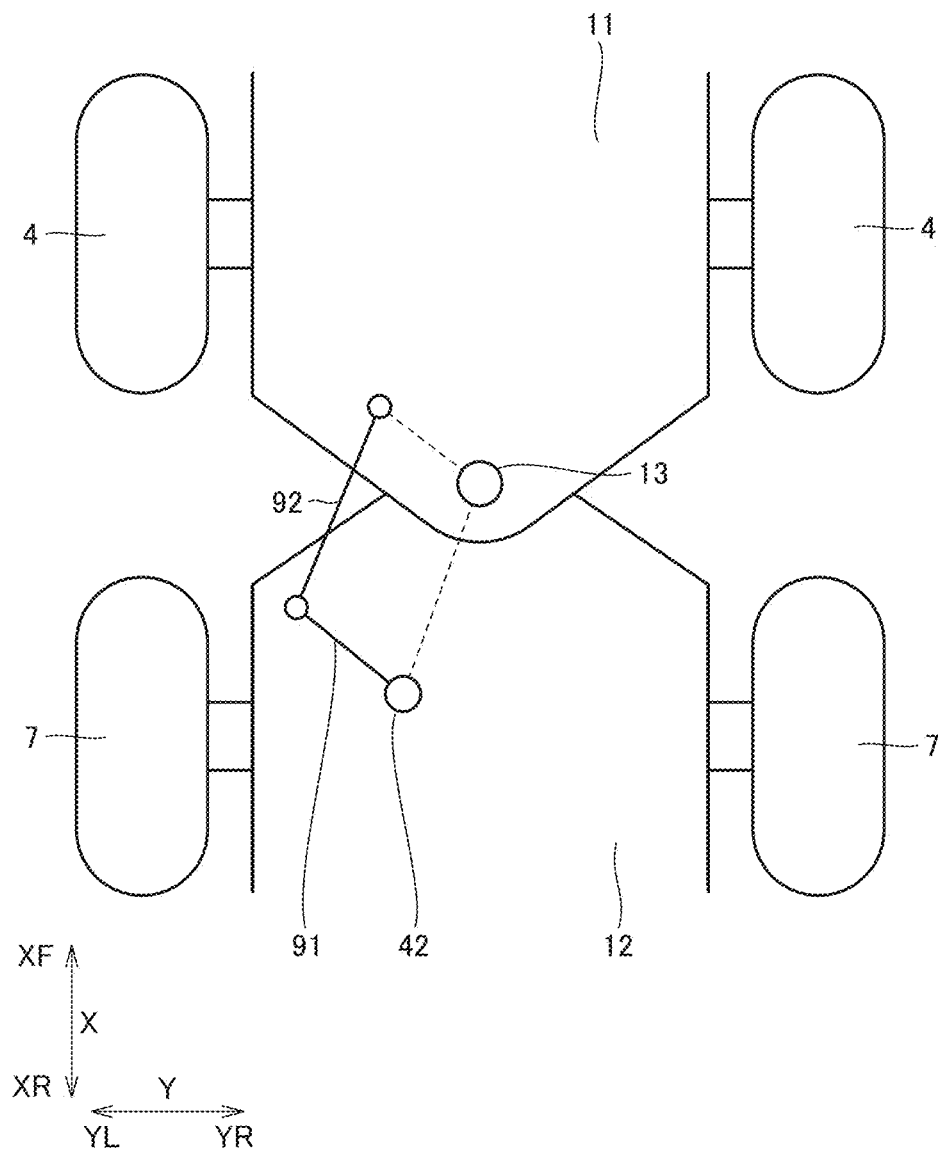
FIG. 4 is a schematic view showing a link mechanism to transmit the current vehicular body bending angle to a steering operation device.

FIG. 4 is a schematic diagram showing a link mechanism to transmit the current vehicular body bending angle to steering operation device 42. The link mechanism includes a first link member 91 and a second link member 92.

First link member 91 and second link member 92 are rod-shaped members. Second link member 92 has a front end rotatably coupled to a bracket fixed to front frame 11. Second link member 92 and first link member 91 have a rear end and a front end, respectively, rotatably coupled to each other. A quadrilateral connecting coupling shaft unit 13, the front end of second link member 92, the rear end of second link member 92, and a rear end of first link member 91 is a parallelogram, and a parallel link is thus formed. A mechanical link mechanism leads from front frame 11 to steering operation device 42 inside cab 5.

Configuration of Steering Operation Device 42

Figure 5:
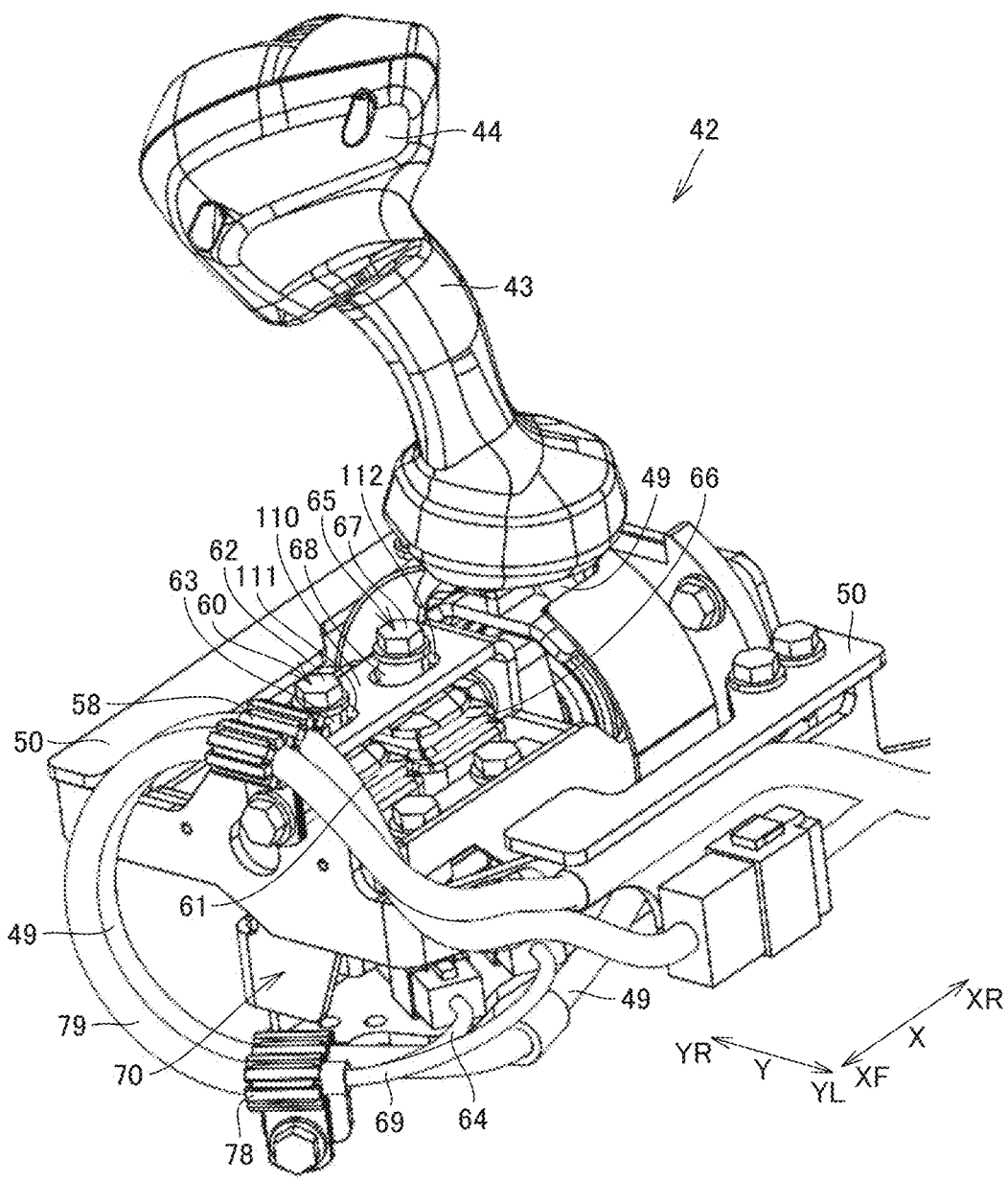
FIG. 5 is a perspective view showing a configuration of the steering operation device.
Figure 6:
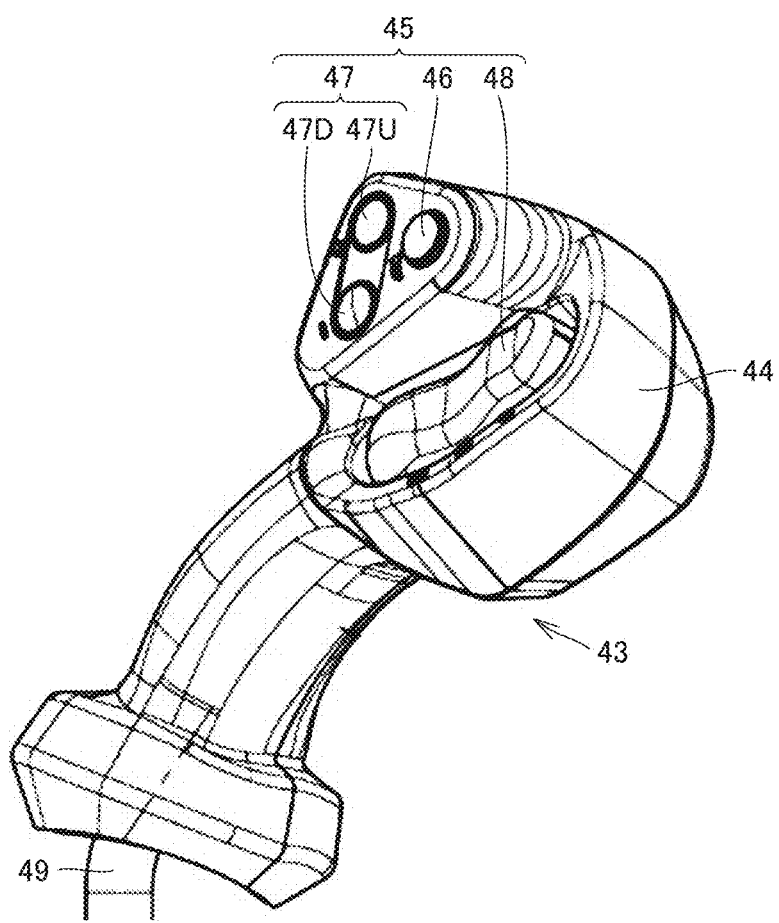
FIG. 6 is a perspective view of a joystick viewed at a different angle.
Figure 7:
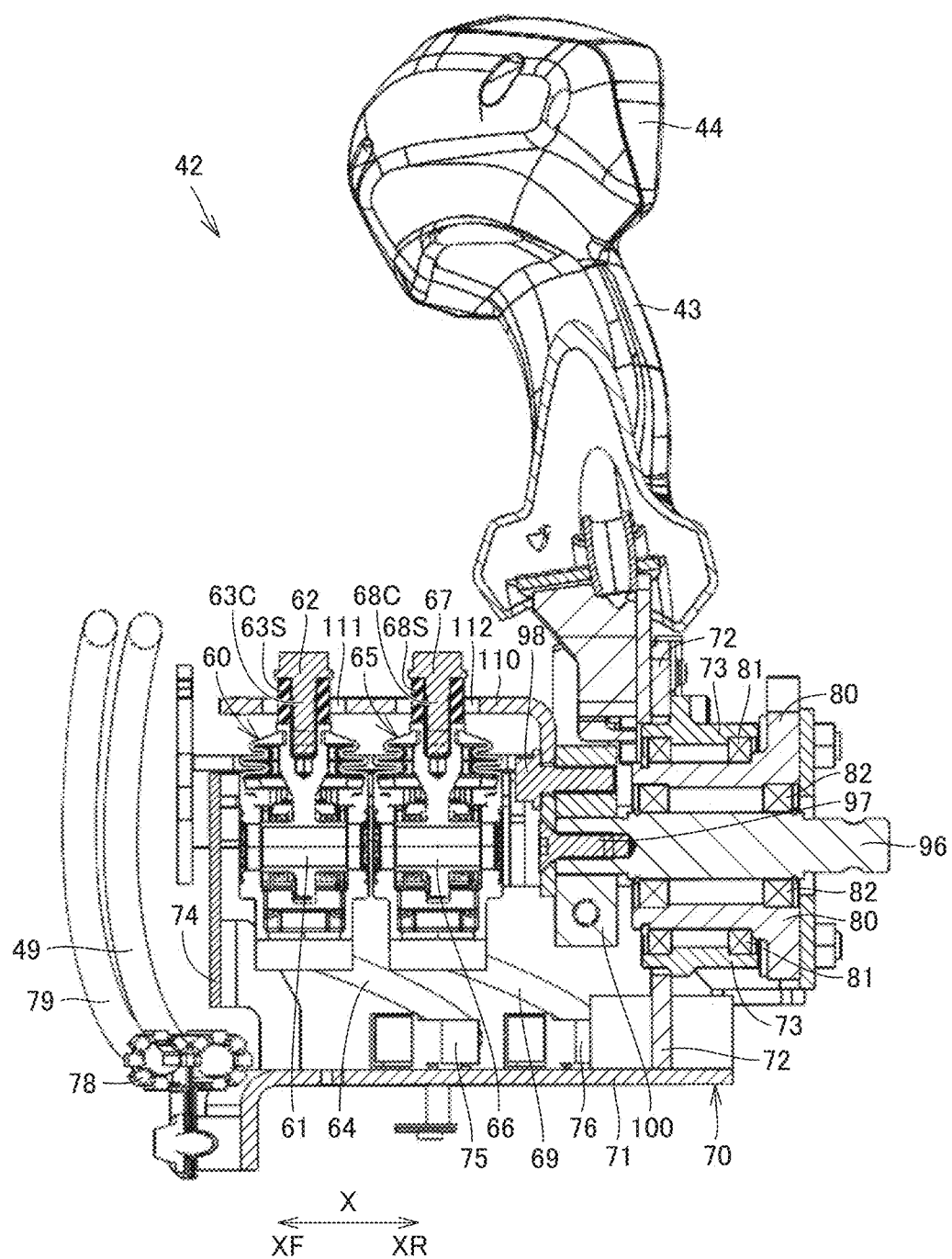
FIG. 7 is a cross section of the steering operation device.
Figure 8:
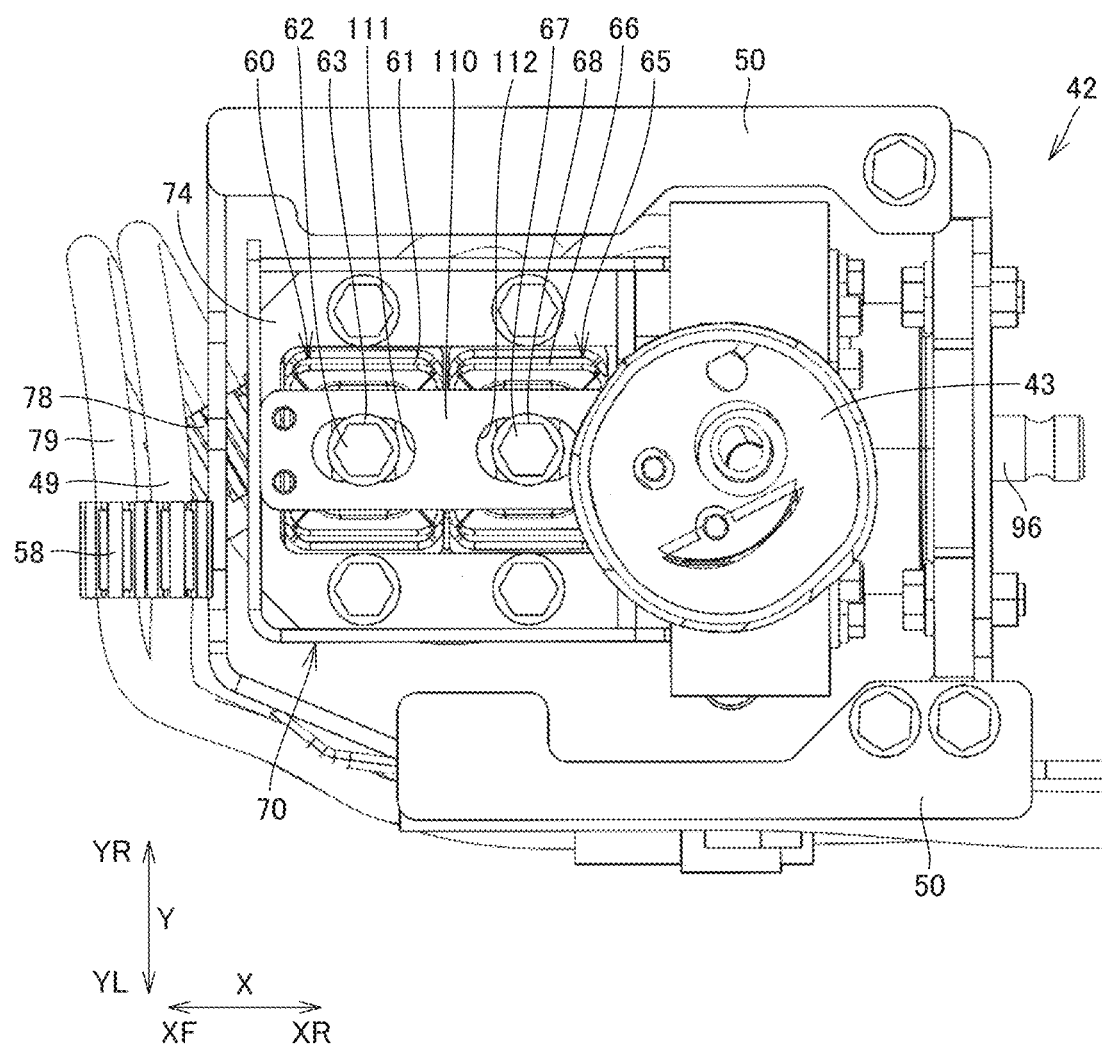
FIG. 8 is a plan view of the steering operation device.

Hereinafter, a configuration of steering operation device 42 of an embodiment will be described in detail. FIG. 5 is a perspective view showing a configuration of steering operation device 42. FIG. 6 is a perspective view of joystick 43 as seen at a different angle. FIG. 7 is a cross section of steering operation device 42. FIG. 8 is a plan view of steering operation device 42.

The operator performs an operation to tilt joystick 43 in the rightward/leftward direction (or the Y direction). By tilting joystick 43 in the rightward direction (or the YR direction), a setting is done to bend vehicular body frame 2 so that front frame 11 tilts rightward with respect to rear frame 12. By tilting joystick 43 in the leftward direction (or the YL direction), a setting is done to bend vehicular body frame 2 so that front frame 11 tilts leftward with respect to rear frame 12. An angle is set for front frame 11 with respect to rear frame 12 in accordance with an angle of tilting of joystick 43 from its neutral state.

Joystick 43 has a distal end with a knob unit 44. Knob unit 44 is provided with a switch unit 45 operated by the operator with a finger. Switch unit 45 includes, for example, a horning operation button 46 pressed to sound a horn. Switch unit 45 includes, for example, a transmission gear switch 47 operated to switch transmission gears while wheel loader 1 travels. Transmission gear switch 47 has a shift-up button 47U that is pressed to shift up a transmission gear and a shift-down button 47D that is pressed to shift down a transmission gear. Switch unit 45 includes, for example, a forward/reverse movement selector switch 48 that is operated to switch between moving forward, moving backward, and being neutral while wheel loader 1 travels.

Steering operation device 42 includes an electric wire 49 for the knob. Electric wire 49 for the knob extends from an inside of joystick 43 to an outside of joystick 43. Electric wire 49 for the knob has one end electrically connected to switch unit 45. Electric wire 49 for the knob corresponds to an example of a first electric wire.

Steering operation device 42 includes a support unit 50. Support unit 50 supports joystick 43 movably relative to support unit 50. Support unit 50 is attached to left console 41. Joystick 43 rotates with respect to left console 41. A fixed clamp 58 is fixed to support unit 50.

Steering operation device 42 includes two electric levers (or steering switches). Specifically, steering operation device 42 includes a first electric lever 60 and a second electric lever 65.

First electric lever 60 includes a first main body unit 61 and a first lever unit 62 tiltable with respect to first main body unit 61. First lever unit 62 includes a first core unit 63C projecting from first main body unit 61, and a first spacer 63S surrounding a periphery of first core unit 63C. An electric wire 64 for the first lever has one end connected to first main body unit 61. Electric wire 64 for the first lever corresponds to an example of a second electric wire. First electric lever 60 has a sensor that senses a tilt angle of first lever unit 62 with respect to first main body unit 61. First electric lever 60 externally outputs through electric wire 64 for the first lever an electrical signal indicating a tilt angle of first lever unit 62 with respect to first main body unit 61.

Second electric lever 65 includes a second main body unit 66 and a second lever unit 67 tiltable with respect to second main body unit 66. Second lever unit 67 has a second core unit 68C projecting from second main body unit 66, and a second spacer 68S surrounding a periphery of second core unit 68C. An electric wire 69 for the second lever has one end connected to second main body unit 66. Electric wire 69 for the second lever corresponds to an example of the second electric wire. Second electric lever 65 has a sensor that senses a tilt angle of second lever unit 67 with respect to second main body unit 66. Second electric lever 65 externally outputs through electric wire 69 for the second lever an electrical signal indicating a tilt angle of second lever unit 67 with respect to second main body unit 66.

First core unit 63C and second core unit 68C are made for example of a metal material, First spacer 63S and second spacer 68S are made for example of a metal material.

Steering operation device 42 includes a movable unit 70. As the operator tilts joystick 43, movable unit 70 moves together with joystick 43 relative to support unit 50. Movable unit 70 mainly includes a base unit 71, a flange unit 72, a sleeve unit 73, a holding unit 74, and a movable clamp 78.

Base unit 71 is provided with a first connector 75. Electric wire 64 for the first lever is connected to first connector 75. Base unit 71 is provided with a second connector 76. Electric wire 69 for the second lever is connected to second connector 76.

Holding unit 74 holds first main body unit 61 of first electric lever 60 and second main body unit 66 of second electric lever 65. First main body unit 61 of first electric lever 60 and second main body unit 66 of second electric lever 65 operate with movable unit 70 integrally. Therefore, first main body unit 61 and second main body unit 66 operate with joystick 43 integrally as the operator tilts joystick 43. First main body unit 61 and second main body unit 66 rotate with respect to left console 41.

Electric wire 64 for the first lever and electric wire 69 for the second lever are inserted into an electric wire sleeve 79 and wired through electric wire sleeve 79. Movable clamp 78 bundles electric wire 49 for the knob and electric wire sleeve 79. Movable clamp 78 bundles electric wire 49 for the knob, electric wire 64 for the first lever, and electric wire 69 for the second lever. Similarly, fixed clamp 58 bundles electric wire 49 for the knob and electric wire sleeve 79, and bundles electric wire 49 for the knob, electric wire 64 for the first lever, and electric wire 69 for the second lever.

At the path of electric wire 49 for the knob, movable clamp 78 bundles electric wire 49 for the knob, electric wire 64 for the first lever, and electric wire 69 for the second lever at a position closer to joystick 43 than fixed clamp 58. At the path of electric wire 64 for the first lever, movable clamp 78 bundles electric wire 49 for the knob, electric wire 64 for the first lever, and electric wire 69 for the second lever at a position closer to first electric lever 60 than fixed clamp 58. At the path of electric wire 69 for the second lever, movable clamp 78 bundles electric wire 49 for the knob, electric wire 64 for the first lever, and electric wire 69 for the second lever at a position closer to second electric lever 65 than fixed clamp 58.

Flange unit 72 is fixed to base unit 71 and is also fixed to a proximal end of joystick 43. Flange unit 72 is in the form of a plate, and, as shown in FIG. 7, has a through hole formed to penetrate in a direction of its thickness. Sleeve unit 73, a frame unit 80, and a transmission member 96 are disposed in the through hole of flange unit 72.

Frame unit 80 is attached to left console 41. Frame unit 80 is generally in the form of a hollow cylinder. Transmission member 96 in the form of a cylindrical shaft is inserted in frame unit 80. An inner bearing 82 supports transmission member 96 rotatably with respect to frame unit 80. Inner bearing 82 has an inner ring attached to an outer peripheral surface of transmission member 96, and inner bearing 82 has an outer ring attached to an inner peripheral surface of frame unit 80.

Transmission member 96 has one end (a right end in FIG. 7) coupled to first link member 91 shown in FIG. 4. The mechanical link mechanism connected from front frame 11 to steering operation device 42 via second link member 92, first link member 91 and transmission member 96, is configured. Through this link mechanism, the current angle of front frame 11 with respect to rear frame 12, that is, the current vehicular body bending angle (FIG. 3), is mechanically transmitted from front frame 11 to steering operation device 42. Transmission member 96 corresponds to one example of a link.

Sleeve unit 73 is disposed on an outer peripheral side of cylindrical frame unit 80. An outer bearing 81 supports sleeve unit 73 rotatably with respect to frame unit 80. Outer bearing 81 has an inner ring attached to an outer peripheral surface of frame unit 80, and outer bearing 81 has an outer ring attached to sleeve unit 73.

Joystick 43, flange unit 72, and sleeve unit 73 are configured to operate integrally. Joystick 43 is rotatable with respect to frame unit 80. Transmission member 96 is rotatable with respect to frame unit 80. Joystick 43 and transmission member 96 are independently rotatable with respect to frame unit 80. The rotation of joystick 43 relative to frame unit 80 does not affect the operation of transmission member 96. The rotation of transmission member 96 with respect to frame unit 80 does not affect the operation of joystick 43, either. Outer bearing 81 supports joystick 43 rotatably relative to transmission member 96.

Transmission member 96 is disposed so as to penetrate a coupling unit 100. Transmission member 96 is disposed such that transmission member 96 has the other end (a left end in FIG. 7) abutting against input unit 110. A bolt 97 penetrates input unit 110 and is also fixed to transmission member 96. Transmission member 96 and input unit 110 are fitted together by bolt 97 and thus integrally coupled together. A bolt 98 fits input unit 110 and coupling unit 100 together and thus couples input unit 110 and transmission member 96 further firmly.

In the FIG. 7 cross section, input unit 110 is in the form of the letter L. Input unit 110 in the form of the letter L has a first side extending in the upward/downward direction (or an upward/downward direction in FIG. 7) and a second side extending in the frontward/rearward direction (or the X direction, or a rightward/leftward direction in FIG. 7). Input unit 110 has the first side coupled to transmission member 96 by bolt 97. Input unit 110 has the second side with two elongated holes 111 and 112. Elongated holes 111 and 112 are formed so as to penetrate plate-shaped input unit 110 in the direction of its thickness. Also referring to FIG. 8, elongated holes 111 and 112 extend in the frontward/rearward direction (or the X direction). Elongated holes 111 and 112 extend in a direction orthogonal to a direction in which the operator tilts joystick 43, i.e., the rightward/leftward direction (or the Y direction).

First electric lever 60 has first lever unit 62 disposed in elongated hole 111. Second electric lever 65 has second lever unit 67 disposed in elongated hole 112. Steering operation device 42 has two electric levers (first electric lever 60 and second electric lever 65). Input unit 110 has two elongated holes 111, 112 equal in number to the electric levers. Each electric lever has its lever unit disposed in a different elongated hole.

First electric lever 60 and second electric lever 65 are aligned in the frontward/rearward direction (or the X direction) orthogonal to the rightward/leftward direction (or the Y direction) in which the operator tilts joystick 43. First electric lever 60, second electric lever 65, and joystick 43 are aligned in this order in the frontward/rearward direction (or the X direction). First electric lever 60 and second electric lever 65 are spaced from joystick 43 in the frontward/rearward direction (or the X direction).

In a plan view from above as shown in FIG. 8, elongated holes 111 and 112 have an elongated shape having a longitudinal direction in the frontward/rearward direction (or the X direction) and a lateral direction in the rightward/leftward direction (or the Y direction). Elongated holes 111 and 112 shown in FIG. 8 have a peripheral edge in the form of a closed curve.

A distance between an outer peripheral surface of first lever unit 62 (or first spacer 63S) and the peripheral edge of elongated hole 111 is maximum in the frontward/rearward direction (or the X direction) and minimum in the rightward/leftward direction (or the Y direction). A distance between first lever unit 62 (or first spacer 63S) and the peripheral edge of elongated hole 111 in the frontward/rearward direction (or the X direction) is larger than a distance between first lever unit 62 (or first spacer 63S) and the peripheral edge of elongated hole 111 in the rightward/leftward direction (or the Y direction).

A distance between an outer peripheral surface of second lever unit 67 (or second spacer 68S) and the peripheral edge of elongated hole 112 is maximum in the frontward/rearward direction (or the X direction) and minimum in the rightward/leftward direction (or the Y direction). A distance between second lever unit 67 (or second spacer 68S) and the peripheral edge of elongated hole 112 in the frontward/rearward direction (or the X direction) is larger than a distance between second lever unit 67 (or second spacer 68S) and the peripheral edge of elongated hole 112 in the rightward/leftward direction (or the Y direction).

Elongated holes 111 and 112 may not have a peripheral edge in the form of a closed curve. Elongated holes 111 and 112 may be a long and narrow gap extending in the frontward/rearward direction (or the X direction). Elongated hole 111 may extend to an edge of input unit 110 and open at the edge of input unit 110. Elongated hole 112 may extend to an edge of input unit 110 and open at the edge of input unit 110. Elongated holes 111 and 112 may be in communication with each other.

First spacer 63S of first lever unit 62 is in the form of a hollow cylinder. Second spacer 68S of second lever unit 67 is in the form of a hollow cylinder. First spacer 63S and second spacer 68S extend in the upward/downward direction. First spacer 63S passes through elongated hole 111. Second spacer 68S passes through elongated hole 112. First spacer 63S and second spacer 68S penetrate plate-shaped input unit 110 in the direction of its thickness. First spacer 63S and second spacer 68S have an axial length larger than the thickness of plate-shaped input unit 110.

Steering Operation for Wheel Loader 1

Steering operation device 42 described above is operated to change a vehicular body bending angle (FIG. 3) of wheel loader 1 to change a direction in which wheel loader 1 travels, as will be described below.

When an operator is seated on driver's seat 31 and performs an operation to tilt joystick 43 by hand rightward/leftward, first main body unit 61 of first electric lever 60 and second main body unit 66 of second electric lever 65 tilt rightward/leftward together with joystick 43.

Meanwhile, transmission member 96 pivots with the frontward/rearward direction (or the X direction) as its axial direction in accordance with the current vehicular body bending angle. As transmission member 96 pivots, input unit 110 coupled to transmission member 96 moves rightward/leftward together with transmission member 96. Input unit 110 has elongated holes 111 and 112. First lever unit 62 is disposed in elongated hole 111. Second lever unit 67 is disposed in elongated hole 112. Input unit 110 moving rightward/leftward presses first lever unit 62 and second lever unit 67 rightward/leftward. Input unit 110 inputs the current vehicular body bending angle that is transmitted by transmission member 96 to first lever unit 62 and second lever unit 67. Input unit 110 presses first lever unit 62 to change an angle at which first lever unit 62 tilts with respect to first main body unit 61. Input unit 110 presses second lever unit 67 to change an angle at which second lever unit 67 tilts with respect to second main body unit 66.

Both an angle of tilting of joystick 43 from its neutral state and the current vehicular body bending angle are mechanically input to first electric lever 60 and second electric lever 65. By tilting joystick 43 from the neutral state, first main body unit 61 of first electric lever 60 and second main body unit 66 of second electric lever 65 operate together with joystick 43 rightward/leftward, and a tilt angle of first lever unit 62 with respect to first main body unit 61 changes and a tilt angle of second lever unit 67 with respect to second main body unit 66 changes. In accordance with the current vehicular body bending angle, input unit 110 presses first lever unit 62 of first electric lever 60 and second lever unit 67 of second electric lever 65 rightward/leftward, and a tilt angle of first lever unit 62 with respect to first main body unit 61 changes and a tilt angle of second lever unit 67 with respect to second main body unit 66 changes.

When a set angle for front frame 11 with respect to rear frame 12 through an operation of joystick 43 is different from the current angle of front frame 11 with respect to rear frame 12 that is fed back to steering operation device 42, first lever unit 62 is tilted with respect to first main body unit 61, and second lever unit 67 is tilted with respect to second main body unit 66. An electrical signal indicating a tilt angle of first lever unit 62 with respect to first main body unit 61 is externally output through electric wire 64 for the first lever. An electrical signal indicating a tilt angle of second lever unit 67 with respect to second main body unit 66 is externally output through electric wire 69 for the second lever.

These electrical signals are input to a controller (not shown). In response to the received electrical signals, the controller generates a control signal indicating an angle for front frame 11 with respect to rear frame 12. The controller outputs the control signal to steering actuator 21 to control steering actuator 21. More specifically, the controller extends and contracts right and left steering actuators 21 so that the vehicular body bending angle approaches the set angle for front frame 11 with respect to rear frame 12.

For example, while wheel loader 1 travels straight ahead, front frame 11 forms an angle of zero degree with respect to rear frame 12, when input unit 110 does not tilt first lever unit 62 and second lever unit 67 rightward/leftward.

When the operator tilts joystick 43 rightward from this state, first main body unit 61 of first electric lever 60 and second main body unit 66 of second electric lever 65 operate together with joystick 43. A period of time is required for steering actuator 21 to operate following the operation of joystick 43, and front frame 11 has an angle remaining zero degree with respect to rear frame 12. An angle of tilting of joystick 43 from the neutral state will be an angular difference between the current angle of front frame 11 with respect to rear frame 12 and the set angle for front frame 11 with respect to rear frame 12. The angle of tilting of joystick 43 from the neutral state will be a tilt angle of first lever unit 62 with respect to first main body unit 61 and a tilt angle of second lever unit 67 with respect to second main body unit 66.

When the controller receives an electrical signal indicating these tilt angles, the controller extends left steering actuator 21 and contracts right steering actuator 21 to bend front frame 11 rightward with respect to rear frame 12. This changes a vehicular body bending angle of wheel loader 1. The vehicular body bending angle increases from zero degree and approaches the set angle for front frame 11 with respect to rear frame 12.

The current vehicular body bending angle is fed back to steering operation device 42 via the mechanical link mechanism. When front frame 11 bends rightward with respect to rear frame 12 and the vehicular body bending angle is changed, input unit 110 presses first lever unit 62 and second lever unit 67 to tilt first lever unit 62 and second lever unit 67 rightward. First lever unit 62 has a reduced tilt angle with respect to first main body unit 61, and second lever unit 67 has a reduced tilt angle with respect to second main body unit 66.

Until the vehicular body bending angle becomes equal to the set angle for front frame 11 with respect to rear frame 12, steering actuator 21 is extended/contracted in an amount adjusted as controlled.

Once the vehicular body bending angle becomes equal to the set angle for front frame 11 with respect to rear frame 12, first lever unit 62 no longer tilts with respect to first main body unit 61, and second lever unit 67 no longer tilts with respect to second main body unit 66. First electric lever 60 outputs zero for a tilt angle of first lever unit 62 with respect to first main body unit 61, and second electric lever 65 outputs zero for a tilt angle of second lever unit 67 with respect to second main body unit 66. The controller receives an electrical signal indicating these tilt angles of zero, and in response stops extending and contracting steering actuator 21 and maintains the current amount of extension and contraction of steering actuator 21. This stops an operation of bending front frame 11 with respect to rear frame 12 and keeps the vehicular body bending angle at the set angle.

Function and Effect

Although hereinafter there will be a description which partially overlaps with the above description, a characteristic configuration as well as function and effect of a work machine according to the present embodiment will be summarized as follows:

As shown in FIGS. 5 and 7 to 8, steering operation device 42 includes joystick 43, first electric lever 60, and input unit 110. Joystick 43 receives an operator's operation for setting an angle for front frame 11 of wheel loader 1 with respect to rear frame 12 of the wheel loader. First electric lever 60 includes first main body unit 61 and first lever unit 62 tiltable with respect to first main body unit 61. First electric lever 60 outputs a tilt angle of first lever unit 62 with respect to first main body unit 61. Input unit 110 inputs an input to first lever unit 62 of first electric lever 60 to tilt first lever unit 62 with respect to first main body unit 61 of the first electric lever. Input unit 110 has elongated hole 111 extending in the frontward/rearward direction (or the X direction). First lever unit 62 is disposed in elongated hole 111.

When a force acts to move input unit 110 in a direction in which joystick 43 is operated, i.e., in the rightward/leftward direction (or the Y direction), a force acts on first lever unit 62 from input unit 110, and first lever unit 62 can tilt with respect to first main body unit 61. When a force acts to move input unit 110 in a direction orthogonal to that in which joystick 43 is operated, i.e., in the frontward/rearward direction (or the X direction), first lever unit 62 can move relative to input unit 110 along elongated hole 111.

First electric lever 60 may have insufficient strength against tilting of first lever unit 62 in a direction different from a direction in which first lever unit 62 tilts with respect to first main body unit 61 as originally intended. Even in this case, first lever unit 62 can move relative to input unit 110 in the different direction, and tilting of first lever unit 62 in the different direction can be avoided. This can suppress occurrence of failure of first electric lever 60 and enhance steering operation device 42 in reliability.

As illustrated in FIG. 7, first lever unit 62 includes first core unit 63C projecting from first main body unit 61, and first spacer 63S surrounding a periphery of first core unit 63C. When an input from input unit 110 to tilt first lever unit 62 with respect to first main body unit 61 acts on first spacer 63S, first core unit 63C tilts together with first spacer 63S with respect to first main body unit 61.

First spacer 63S interposed between first core unit 63C and the peripheral edge of elongated hole 111 ensures that an input to tilt first lever unit 62 is input from input unit 110 to first lever unit 62 even if first core unit 63C is positionally displaced with respect to input unit 110 in the rightward/leftward direction. First spacer 63S disposed through elongated hole 111 ensures that an input to tilt first lever unit 62 is input from input unit 110 to first lever unit 62 even if first core unit 63C is positionally displaced with respect to input unit 110 in a direction in which first lever unit 62 projects from first main body unit 61. Steering operation device 42 can thus be enhanced in reliability.

When a force acts to move input unit 110 in a direction in which first lever unit 62 extends, first lever unit 62 can move relative to input unit 110. First lever unit 62 may have insufficient strength against a load acting on first lever unit 62 in a direction in which first lever unit 62 projects from first main body unit 61. Even in this case, first lever unit 62 can move relative to input unit 110 in the direction in which the first lever unit projects from the first main body unit, and the load acting on first lever unit 62 in the direction can be avoided. This can suppress occurrence of failure of first electric lever 60.

As shown in FIGS. 5 and 7 to 8, joystick 43 and first lever unit 62 are spaced from each other in the frontward/rearward direction (or the X direction). Joystick 43 is not directly attached to first lever unit 62, and even when an operation is performed to attempt to tilt joystick 43 in a direction (e.g., the frontward/rearward direction) different from a direction in which joystick 43 is tilted as originally intended (i.e., the rightward/leftward direction), a force generated by joystick 43 thus operated will never be transmitted directly to first lever unit 62. This ensures that first lever unit 62 is prevented from tilting in a direction different from a direction in which first lever unit 62 tilts with respect to first main body unit 61 as originally intended, and can thus suppress occurrence of failure of first electric lever 60.

As shown in FIGS. 4 and 7, transmission member 96 mechanically transmits the current angle of front frame 11 with respect to rear frame 12 to steering operation device 42. Input unit 110 is coupled to transmission member 96. The current vehicular body bending angle is fed back to steering operation device 42 via transmission member 96. Input unit 110 inputs the current vehicular body bending angle that is transmitted by transmission member 96 to first lever unit 62 of first electric lever 60. First electric lever 60 outputs a tilt angle of first lever unit 62 with respect to first main body unit 61 based on an angular difference between a set angle for front frame 11 with respect to rear frame 12 according to an operation of joystick 43 and the current vehicular body bending angle. By appropriately controlling steering actuator 21 based on the tilt angle, an angle of front frame 11 with respect to rear frame 12 can be easily matched to the set value.

As shown in FIG. 7, steering operation device 42 includes outer bearing 81. Outer bearing 81 supports joystick 43 rotatably relative to transmission member 96. Outer bearing 81 is caused to hold joystick 43, and joystick 43 is not directly attached to first lever unit 62. Outer bearing 81 receives a force generated as joystick 43 is operated to attempt to tilt joystick 43 in a direction different from a direction in which joystick 43 is tilted as originally intended (i.e., the rightward/leftward direction) (e.g., the frontward/rearward direction), and the operation attempted to tilt joystick 43 in the different direction cannot be performed. This ensures that first lever unit 62 is prevented from tilting in a direction different from a direction in which first lever unit 62 tilts with respect to first main body unit 61 as originally intended, and can thus suppress occurrence of failure of first electric lever 60.

As shown in FIG. 7, transmission member 96 pivots with the frontward/rearward direction (or the X direction) as an axial direction. Input unit 110 is coupled to transmission member 96, and the pivoting of transmission member 96 is input to first lever unit 62 via input unit 110. This ensures that first lever unit 62 is tilted with respect to first main body unit 61 in a direction in which joystick 43 is tilted, that is, in the rightward/leftward direction.

As shown in FIGS. 5 and 7 to 8, steering operation device 42 includes first electric lever 60 and second electric lever 65. Input unit 110 has elongated hole 111 and elongated hole 112. First electric lever 60 has first lever unit 62 disposed in elongated hole 111. Second electric lever 65 has second lever unit 67 disposed in elongated hole 112. Steering operation device 42 having a plurality of electric levers and thus made redundant is enhanced in reliability.

When a force acts to move input unit 110 in a direction orthogonal to a direction in which joystick 43 is operated, first lever unit 62 can move relative to input unit 110 along elongated hole 111, and second lever unit 67 can move relative to input unit 110 along elongated hole 112. This can suppress occurrence of failure of first electric lever 60 and second electric lever 65. First electric lever 60 is disposed in elongated hole 111 extending in the frontward/rearward direction and second electric lever 65 is disposed in elongated hole 112 extending in the frontward/rearward direction, and relative positional displacement of first electric lever 60 and second electric lever 65 in the frontward/rearward direction is permitted.

As shown in FIGS. 5 and 7 to 8, first electric lever 60 and second electric lever 65 are aligned in the frontward/rearward direction (or the X direction). First lever unit 62 is disposed in elongated hole 111, and an input is received from a peripheral edge of elongated hole 111 and input to first lever unit 62 to tilt first lever unit 62. Second electric lever 65 is disposed in elongated hole 112, and an input is received from a peripheral edge of elongated hole 112 and input to second lever unit 67 to tilt second lever unit 67. Even when first electric lever 60 and second electric lever 65 are positionally displaced in the rightward/leftward direction, the displacement can be absorbed, and first lever unit 62 and second lever unit 67 can be tilted in the same manner by the inputs from input unit 110.

The above embodiment has been described by referring to an example in which input unit 110 is coupled to transmission member 96 and an electric lever's main body unit and joystick 43 integrally operate. This example is not exclusive, and the electric lever's main body unit and transmission member 96 may integrally operate and a vehicular body bending angle fed back may be transmitted as tilting of the main body unit. Input unit 110 may be coupled to joystick 43 and an electric lever may have a lever unit tilted as joystick 43 is tilted. The electric lever's lever unit and joystick 43 may not necessarily be spaced from each other in the frontward/rearward direction, and joystick 43 may be directly attached to the lever unit.

Even in such a case, with the electric lever having the lever unit disposed in the elongated hole extending in the frontward/rearward direction, the lever unit can move relative to joystick 43 in the frontward/rearward direction when a force acts on joystick 43 to attempt to tilt joystick 43 in the frontward/rearward direction. Tilting of the lever unit in the frontward/rearward direction can be avoided, and occurrence of failure of the electric lever can be suppressed.

While the above embodiment has been described by referring to wheel loader 1 as one example of a work machine, it is also applicable to other types of work machines such as articulated dump trucks, motor graders and so forth.

Additional Notes

The above description includes the following additionally noted features:

(Additional Note 1)

A work machine comprising:
a vehicular body frame having a rear frame and a front frame rotatably coupled to the rear frame;
a steering actuator that changes an angle of the front frame with respect to the rear frame; and
a steering operation device operated by an operator to operate the steering actuator,
the steering operation device including:
a joystick that receives an operation performed by the operator;
at least one electric lever that has a main body unit and a lever unit tiltable with respect to the main body unit and outputs a tilt angle of the lever unit with respect to the main body unit; and
an input unit that inputs an input to the lever unit to tilt the lever unit with respect to the main body unit,
the input unit having at least one elongated hole extending in an orthogonal direction orthogonal to a direction in which the operator tilts the joystick,
the lever unit being disposed in the elongated hole.

(Additional Note 2)

The work machine according to Additional Note 1, wherein the lever unit includes a core unit projecting from the main body unit and a spacer surrounding a periphery of the core unit.

(Additional Note 3)

The work machine according to Additional Note 1 or 2, wherein the joystick and the lever unit are spaced from each other in the orthogonal direction.

(Additional Note 4)

The work machine according to any one of Additional Notes 1 to 3, further comprising a link that mechanically transmits to the steering operation device a current angle of the front frame with respect to the rear frame, wherein the input unit is coupled to one of the link and the joystick.

(Additional Note 5)

The work machine according to Additional Note 4, wherein the steering operation device further includes a bearing that supports the joystick rotatably relative to the link.

(Additional Note 6)

The work machine according to Additional Note 4 or 5, wherein the link pivots with the orthogonal direction as an axial direction.

(Additional Note 7)

The work machine according to any one of Additional Notes 1 to 6, wherein
the at least one electric lever has a plurality of electric levers,
the input unit has the elongated hole so as to be equal in number to the electric levers, and
the electric levers each have the lever unit disposed in a different elongated hole.

(Additional Note 8)

The work machine according to Additional Note 7, wherein the plurality of electric levers are aligned in the orthogonal direction.

It should be understood that the embodiments disclosed herein have been described for the purpose of illustration only and in a non-restrictive manner in any respect. The scope of the present invention is defined by the terms of the claims, rather than the description above, and is intended to encompass any modifications within the meaning and scope equivalent to the terms of the claims.

REFERENCE SIGNS LIST

1 wheel loader, 2 vehicular body frame, 3 work implement, 4, 7 traveling wheel, 5 cab, 11 front frame, 12 rear frame, 13 coupling shaft unit, 14 boom, 15 bucket, 21 steering cylinder, 31 driver's seat, 40 left armrest, 41 left console, 42 steering operation device, 43 joystick, 44 knob unit, 45 switch unit, 46 horning operation button, 47 transmission gear switch, 47D shift-down button, 47U shift-up button, 48 forward/reverse movement selector switch, 49 electric wire for knob, 50 support unit, 58 fixed clamp, 60 first electric lever, 61 first main body unit, 62 first lever unit, 63C first core unit, 63S first spacer, 64 electric wire for first lever, 65 second electric lever, 66 second main body unit, 67 second lever unit, 68C second core unit, 68S second spacer, 69 electric wire for second lever, 70 movable unit, 71 base unit, 72 flange unit, 73 sleeve unit, 74 holding unit, 75 first connector, 76 second connector, 78 movable clamp, 79 electric wire sleeve, 80 frame unit, 81 outer bearing, 82 inner bearing, 91 first link member, 92 second link member, 96 transmission member, 97, 98 bolt, 100 coupling unit, 110 input unit, 111, 112 elongated hole, X frontward/rearward direction, Y rightward/leftward direction.

The invention claimed is:

1. A work machine comprising:
 a vehicular body frame having a rear frame and a front frame rotatably coupled to the rear frame;
 a steering actuator that changes an angle of the front frame with respect to the rear frame; and
 a steering operation device operated by an operator to operate the steering actuator, the steering operation device including:
  a joystick that receives an operation performed by the operator;
  at least one electric lever that has a main body unit and a lever unit tiltable with respect to the main body unit and outputs a tilt angle of the lever unit with respect to the main body unit; and
  an input unit that inputs an input to the lever unit to tilt the lever unit with respect to the main body unit,
  the input unit having at least one elongated hole extending in an orthogonal direction orthogonal to a direction in which the operator tilts the joystick,
  the lever unit being disposed in the elongated hole.

2. The work machine according to claim 1, wherein the lever unit includes a core unit projecting from the main body unit and a spacer surrounding a periphery of the core unit.

3. The work machine according to claim 1, wherein the joystick and the lever unit are spaced from each other in the orthogonal direction.

4. The work machine according to claim 1, further comprising a link that mechanically transmits to the steering operation device a current angle of the front frame with respect to the rear frame, wherein
 the input unit is coupled to one of the link and the joystick.

5. The work machine according to claim 4, wherein the steering operation device further includes a bearing that supports the joystick rotatably relative to the link.

6. The work machine according to claim 4, wherein the link pivots with the orthogonal direction as an axial direction.

7. The work machine according to claim 1, wherein
 the at least one electric lever has a plurality of electric levers,
 the input unit has the elongated hole so as to be equal in number to the electric levers, and
 the electric levers each have the lever unit disposed in a different elongated hole.

8. The work machine according to claim 7, wherein the plurality of electric levers are aligned in the orthogonal direction.

* * * * *